Patented Aug. 8, 1944

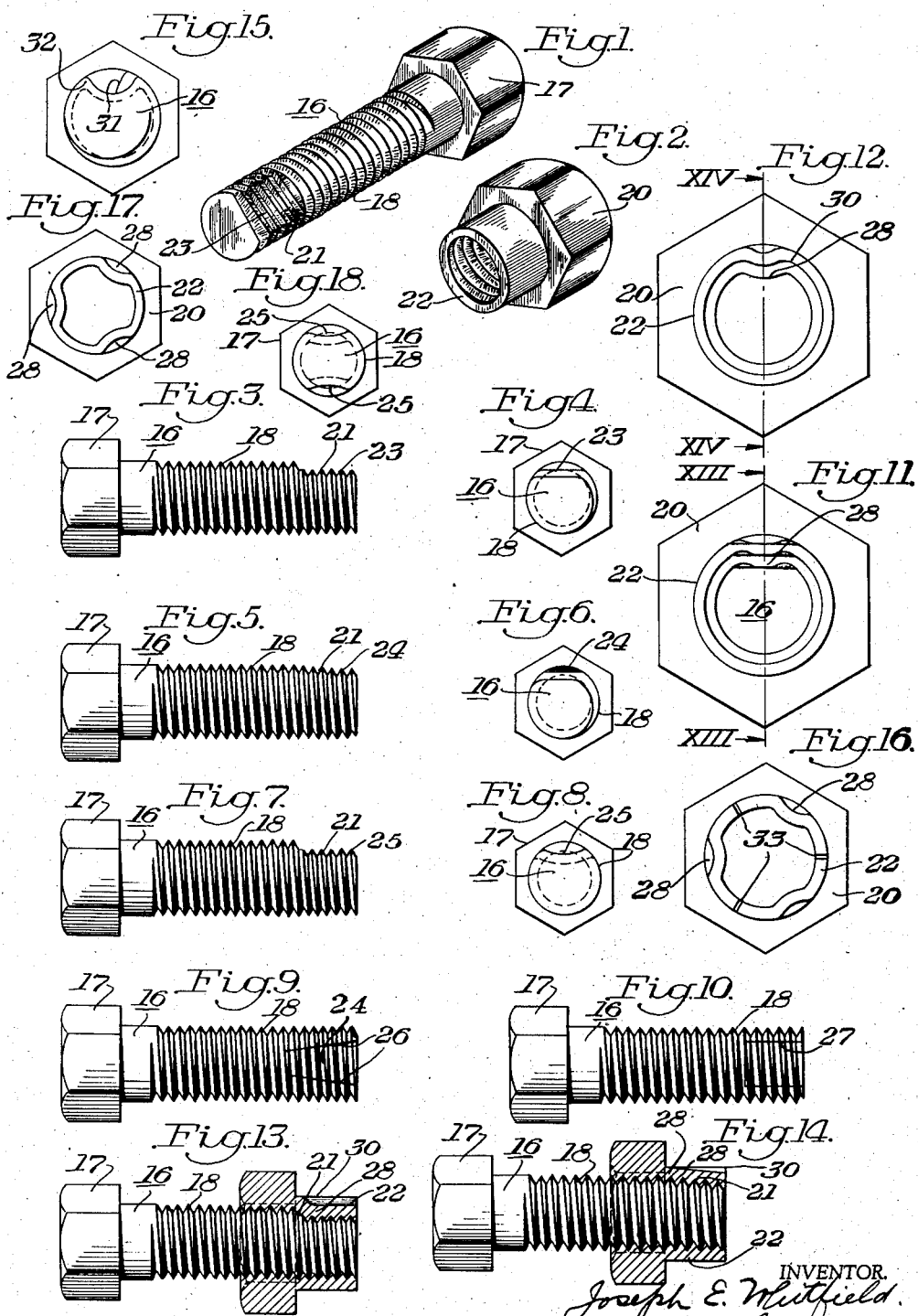

2,355,253

UNITED STATES PATENT OFFICE 2,355,253

BOLT AND LOCK NUT

Joseph E. Whitfield, Hamilton, Ohio

Application February 7, 1942, Serial No. 429,898

10 Claims. (Cl. 151—21)

This invention relates generally to bolt and lock nuts and more particularly to a coupled nut and bolt thread lock wherein the nut and bolt are preformed and the nut is distorted to lock with the bolt.

The principal object of this invention is the provision of a preformed nut and bolt that may be quickly and easily locked against accidental displacement in any relative angular position and is capable of being removed by a wrench with the application of sufficient force and without destroying parts of either the nut or bolt so that they may be used repeatedly.

Another object is the provision of preformed bolt and nut members wherein the nut is locked by distortion and when repeatedly coupled and uncoupled the preformed sections will not cut or destroy the threads of the members.

Other objects and advantages appear in the following description and claims.

In the accompanying drawing practical embodiments illustrating the principles of this invention are shown wherein:

Fig. 1 is a perspective view of a bolt having a flat preformed threaded section.

Fig. 2 is a perspective view of a nut having a preformed threaded cylindrical section.

Fig. 3 is a side elevation of a bolt having a preformed threaded section.

Fig. 4 is an end view of Fig. 3.

Fig. 5 is a side elevation of a bolt having a tapered preformed threaded section.

Fig. 6 is an end view of Fig. 5.

Fig. 7 is a side elevation of a bolt having a concave preformed threaded section.

Fig. 8 is an end view of Fig. 7.

Fig. 9 is a top plan view of the bolt shown in Fig. 5.

Fig. 10 is a top plan view of the bolts shown in Figs. 1, 3 and 7.

Fig. 11 is an enlarged end view of a nut locked to a bolt of the character shown in Fig. 1.

Fig. 12 is an enlarged end view of a nut locked to a bolt of the character shown in Figs. 7 and 8.

Fig. 13 is an enlarged sectional view taken on the line 13—13 of Fig. 11.

Fig. 14 is an enlarged sectional view taken on the line 14—14 of Fig. 12.

Fig. 15 is an enlarged end elevation of a bolt having a concave preformed threaded section of short radius.

Fig. 16 is an end elevation of a nut having a split collar.

Fig. 17 is a view similar to Fig. 16 showing a nut with permanent indentations in the sleeve which is not split.

Fig. 18 is a view similar to Fig. 8 showing a bolt having opposed preformed concave sections in the threaded length of the bolt.

Referring to the drawing, each bolt 16 is provided with the head 17 and the threaded portion 18. The approximate position that the nut 20 is to be screwed along the threaded portion of the bolt is preformed as illustrated at 21. Generally this preformed portion is adjacent the end of the threaded portion of the bolt. However, in installations where a long bolt is required and one or more nuts are to be screwed thereon this preformed section may also be formed at an intermediate position along the threaded section.

The nut 20 is provided with an integral axially extending annular flange or collar 22 of relatively small outside diameter as compared to the diameter of the full stock from which the nut is formed. This preformed portion may be easily made by cutting away the nut stock. The perimetral surface of the flange is preferably cylindrical but may be made frusto conical or any other suitable form, provided that it is heavy enough to carry the thread of the nut but is sufficiently thin that it can become indented or set to lock the nut by a blow of a blunt instrument or setting tool or by squeezing with a pair of pliers constructed for this purpose. Thus a continuous thread is provided in the bore of the nut and the axially extending annular flange or collar.

The preformed section 21 of the bolt may have three different shapes. It may take the shape of a flat portion lying in a plane parallel to the axis of the bolt as illustrated at 23 in Figs. 1, 3 and 4. Again it may be beveled or tapered lying in a plane disposed at an angle to the axis of the bolt as illustrated at 24 in Figs. 5 and 6. On the other hand the preformed section of the bolt may be formed with a concave arcuate surface as illustrated at 25 in Figs. 7 and 8. This preformed surface 25 may lie in a plane parallel to the axis of the bolt as illustrated at 23 in Fig. 3 or the concave surface may be disposed at an angle to the axis of the bolt as illustrated in Fig. 5.

In each instance a thread is cut in the preformed section 21 of the bolt 16. This thread is a continuation of the bolt thread and is the same pitch and of the same depth but it follows the contour of the preformed section. By continuing the thread across the flattened or concave preformed sections there are no cutting profiles along the marginal edges and when the flange 22 of the nut is indented the thread of the flange interengages the thread portion of the preformed section 21 of the bolts and securely locks the nut in place.

In the United States Letters Patent No. 930,450 to Zinow a beveled or tapered section is shown on the bolt. However this form of lock nut is impractical because the sharp profiles formed by the threads on the sides of the beveled surface act as cutting profiles which dig into the indented portion of the threaded flange section on the nut, destroying it so that it cannot be used a second time.

This invention eliminates this disadvantage and provides an additional thread engaging surface across the preformed surface that furthers the locking characteristics of the nut and bolt without any detrimental effect on either interengaging part.

By continuing the thread around the corners of the preformed section of the bolt the crests and the grooves become rounded to a short radius and the sides of the threads act as a cam-engaging surface in raising the indented portion of the flange on the nut. In view of the fact that these preformed threaded sections have the same thread pitch, the sides of the threads do not gall when raising the indented portion of the flange.

The sides of the preformed tapered section 24 shown in Figs. 5 and 6 converge as they leave the end and approach the top of the bolt as illustrated by the lines 26 in Fig. 9.

It has been found that either the flat, tapered or concave preformed sections on the bolts are preferably milled by a cutter thread, the axis of which lies in a vertical plane that is disclosed at an angle to the axis of the bolt as illustrated by the ends of the cut as shown at 26 and 27 in Figs. 9 and 10. However the locking characteristics are attainable when milled by a thread cutter, the axis of which is in the same vertical plane as the axis of the bolt. The preferable form 26 is disposed so that the threads formed by the cutter are parallel with the bolt threads and the angle between the axis of the cutter and the axis of the bolt is the same as the angle of pitch of the threads.

In Figs. 11 and 13 the nut 20 is shown in position on the bolts having a flat or tapered preformed section and in Figs. 12 and 14 the preformed section is concave. The indentation 28 closely fits the contour of the concave surface 25 for the full extent thereof, as illustrated in Fig. 12. Ordinarily the indentation 28 in the flange of the nut is deeper. This construction is better suited for locking nuts that would not be frequently opened. In the flat or tapered preformed sections as illustrated in Fig. 11 the indentation 28 is not as deep and the corresponding complementary surfaces of the preformed nut and bolt surfaces are not in engagement at the sides as indicated at 30. This form provides adequate locking and is preferably used where the nut may be removed more frequently since the indentation 28 is not as deep as that resulting from a concave preformed surface.

The thread in the flange 22 is the same as that of the nut proper and it provides a bearing surface which retains the nut in proper axial alignment when the nut is rotated to lift the indented portion. When the threaded portions of the nut and bolt fit snugly the threads of the indented portion of the flange snugly fit the threads of the preformed section of the bolt and tightly lock them against relative rotary movement. Again the threaded flange protects the bolt threads from accidental rupture.

The preformed concave surface 31 of the bolt shown in Fig. 15 is of a shorter radius than the concave surface 25 shown in Figs. 8 and 12, and the rounded marginal sides 32 of the concave portion are more pronounced. If a tool having a wide rounded apex is used to indent and set the nut to fill the concavity 31, the flange 22 will be pulled tightly against the whole of the perimetral surface of the bolt because the circumferential measurement of the surface of the bolt, including the concavity 31, is greater than the inner circumferential surface of the flange 22. It is apparent that under these conditions the shoulders 32 tightly grip the flange 22 as it is formed thereover. If the concavity is shallow or has the same radius as the bolt, as shown at 25 in Fig. 8, the complementary circumferential surfaces of the nut and bolt are approximately the same. When set the nut is locked tight in full engagement but there are no forces tending to stretch the metal in the flange 22 as with the structure of Fig. 15.

The flange 22 of the nut shown in Fig. 16 is segregated into three independent sections by the saw cuts 33 and each section is provided with a preformed indentation 28. The flange sections may be heat treated to give them resiliency and to provide radial pressure on the threaded section of the bolt. This radial pressure is sufficient to lock the nut on an ordinary bolt and when used with a bolt of the character described having mating concave preformed surfaces on the opposite sides thereof one of the indentations 28 will mesh with one of the preformed sections of the bolt and lock the nut in place. The resiliency of the flange sections of this nut resists its movement but the indentures prevent the threads of both members from galling.

The flange 22 of the nut shown in Fig. 17 is also provided with three indentations 28 but the flange is not segregated into three independent sections as illustrated in Fig. 16. This nut is obviously tight when it is screwed on or off an ordinary bolt as the shallow indentations 28 tightly grip the threads. If the bolt has one or more preformed sections these indentations will become locked with the same in the manner described above.

In Fig. 18 the bolt 16 is provided with two preformed concave sections 25 disposed diametrically from one another. When a bolt of this character is used with a nut such as that shown in Figs. 16 and 17 the nut may be screwed home with assurance that one of the indentations 28 are in engagement with one of the preformed sections 25.

In some instances it is desirable to provide a loose joint and the nut cannot be screwed home for fear the pressure will cause the joint to bind, yet it is necessary to lock the nut on the bolt. This can readily be accomplished by the use of this invention as the nut will lock to the bolt at any desired position.

The depth of the preformed surfaces 23, 24, 25 and 31 must be selected to suit the application of the bolt. The same is true of the degree of the indentations 28 in the flange of the nut. In some instances the figures on the drawing are exaggerated for the purpose of clearly illustrating the invention.

This invention may be employed as a tap or stud bolt by providing a relatively thin wall in the tapped piece adjacent the preformed portion of the bolt which is accessible from the exterior of the tapped piece and can be indented by a punch or other similar tool.

I claim:

1. A threaded bolt for the purpose described having an indented portion formed along the threaded length of the bolt, threads cut across said portion and arranged to connect the bolt threads on each side of said portion and form a continuation of the bolt threads.

2. A threaded bolt for the purpose described having a flat portion formed along the threaded length of the bolt, threads cut across said portion and arranged to connect the bolt threads on each side of said portion and form a continuation of the bolt threads.

3. A threaded bolt for the purpose described having a flat portion formed along the threaded length which converges toward the axis adjacent the end of the bolt, threads cut across said portion and arranged to connect the bolt threads on each side of said portion and form a continuation of the bolt threads.

4. A threaded bolt for the purpose described having a concave portion formed along the threaded length of the bolt, threads cut across said portion and arranged to connect the bolt threads on each side of said portion and form a continuation of the bolt threads.

5. A threaded bolt for the purpose described having an indented portion formed parallel to the longitudinal axis of and along the threaded length of the bolt, threads cut across said portion and arranged to connect the bolt threads on each side of said portion and form a continuation of the bolt threads.

6. A threaded bolt for the purpose described having a concave portion formed along the threaded length of the bolt and of a radius equal to the radius of the bolt, threads cut across said portion and arranged to connect the bolt threads on each side of said portion and form a continuation of the bolt threads.

7. A threaded bolt for the purpose described having a concave portion formed along the threaded length of the bolt and of a radius less than the radius of the bolt, threads cut across said portion and arranged to connect the bolt threads on each side of said portion and form a continuation of the bolt threads.

8. The combination of a threaded bolt for the purpose described having an indented portion formed along the threaded length of the bolt, threads cut across said portion and arranged to connect the bolt threads on each side of said portion and form a continuation of the bolt threads, and a nut having a plurality of axially extending flange sections, each flange section carrying the thread of the nut and having an indentation arranged to interengage the threads on the indented portion of the bolt to lock them together.

9. A threaded nut for the purpose described having an axially extending circular flange carrying the threads of the nut, said flange being divided into a plurality of independent sections, each section having an indentation which raises that portion of the threaded surface above the adjacent threaded surface in said surface.

10. The combination of a threaded bolt for the purpose described having an indented portion extending along the threaded length of the bolt, threads cut across said indented portion and disposed to connect the threads of the bolt at each side of the indented portion and form continuations of the bolt threads, and a threaded nut screwed on said bolt having an annular axially extending flange provided with interior threads continuing the threads of the nut and said flange having an indentation sufficient to interengage the threads of the nut and the threads on the indented portion of the bolt to enable the nut to be forcibly unscrewed from the bolt without injury to the threads of the nut and bolt.

JOSEPH E. WHITFIELD.